US012656783B2

(12) United States Patent
Kakkar et al.

(10) Patent No.: US 12,656,783 B2
(45) Date of Patent: Jun. 16, 2026

(54) AUTONOMOUS VEHICLE BOUNDARY INTERSECTION DETECTION AND AVOIDANCE

(71) Applicant: Trimble Inc., Westminster, CO (US)

(72) Inventors: Shantnu Kakkar, Alpharetta, GA (US); Juan Carlos Santamaria, Alpharetta, GA (US); Eduardo Wiputra, Broomfield, CO (US); Joshua Rands, Superior, CO (US); Brandon Sights, San Marcos, CA (US); Caroline Starbird, Westminster, CO (US)

(73) Assignee: Trimble Inc., Westminster, CO (US)

( * ) Notice: Subject to any disclaimer, the term of this patent is extended or adjusted under 35 U.S.C. 154(b) by 202 days.

(21) Appl. No.: 17/981,725

(22) Filed: Nov. 7, 2022

(65) Prior Publication Data

US 2024/0147888 A1 May 9, 2024

(51) Int. Cl.
*G05D 1/229* (2024.01)
*A01B 69/00* (2006.01)
(Continued)

(52) U.S. Cl.
CPC ......... *G05D 1/2295* (2024.01); *A01B 69/004* (2013.01); *A01B 69/008* (2013.01);
(Continued)

(58) Field of Classification Search
CPC .. A01B 69/008; A01B 69/004; G05D 1/0214; G05D 1/0223; G05D 2105/15;
(Continued)

(56) References Cited

U.S. PATENT DOCUMENTS 6,112,143 A * 8/2000 Allen ..................... E02F 3/842
701/445
6,842,684 B1 * 1/2005 Kade ........................ B60T 7/22
701/79
(Continued)

OTHER PUBLICATIONS

Partial European Search Report for Application No. 23205160.7-1205, mailed Feb. 9, 2024, 16 pages.
(Continued)

*Primary Examiner* — Abby Lin
*Assistant Examiner* — Karston G. Evans
(74) *Attorney, Agent, or Firm* — Kilpatrick Townsend & Stockton LLP

(57) ABSTRACT

Techniques for autonomous vehicle boundary intersection detection and avoidance are described. In an example, a geofence boundary is received at a display coupled to a control module of a vehicle. A 2D footprint is generated using a definition of the vehicle and an implement coupled to the vehicle. Using geographic coordinates for the vehicle, a current position and orientation for the footprint are determined. A 2D projection footprint is generated for the vehicle using the current position and orientation, a current steering state, and a direction of travel. A first distance from the current position and orientation at which the projection footprint intersects with the boundary is determined. Based on the first distance, the speed of the vehicle is maintained at or below a maximum speed.

20 Claims, 7 Drawing Sheets

(51) Int. Cl.
*A01B 69/04* (2006.01)
*G05D 1/00* (2024.01)
*G05D 1/622* (2024.01)
*G05D 105/15* (2024.01)
*G05D 107/20* (2024.01)

(52) U.S. Cl.
CPC ......... *G05D 1/0214* (2013.01); *G05D 1/0223* (2013.01); *G05D 1/637* (2024.01); *G05D 2105/15* (2024.01); *G05D 2107/21* (2024.01)

(58) Field of Classification Search
CPC ........... G05D 2107/21; G05D 2109/10; G05D 1/2295; G05D 1/672; G05D 1/637
See application file for complete search history.

(56) References Cited

U.S. PATENT DOCUMENTS

| | | | |
|---|---|---|---|
| 7,676,967 | B2 | 3/2010 | Gharsalli et al. |
| 2006/0091297 | A1* | 5/2006 | Anderson ............... G01S 17/08 |
| | | | 250/221 |
| 2009/0319112 | A1 | 12/2009 | Fregene et al. |
| 2011/0054689 | A1* | 3/2011 | Nielsen ............... G05D 1/0214 |
| | | | 700/258 |
| 2013/0222592 | A1* | 8/2013 | Gieseke ................. G08G 1/165 |
| | | | 348/148 |
| 2014/0032184 | A1* | 1/2014 | Carrasco ................. G06F 30/20 |
| | | | 703/1 |
| 2014/0324272 | A1* | 10/2014 | Madsen ............... G05D 1/0246 |
| | | | 701/28 |
| 2016/0057920 | A1* | 3/2016 | Spiller ................. A01B 79/005 |
| | | | 701/50 |
| 2017/0367252 | A1 | 12/2017 | Sakaguchi et al. |
| 2018/0206392 | A1 | 7/2018 | Matsuzaki |
| 2018/0319396 | A1* | 11/2018 | Foster ............... B60W 30/0956 |
| 2019/0163190 | A1 | 5/2019 | Ono |
| 2020/0198621 | A1* | 6/2020 | Englert ................. B60T 17/221 |
| 2020/0371531 | A1 | 11/2020 | Thode |
| 2021/0114590 | A1* | 4/2021 | Matsunaga ........... B60W 10/20 |
| 2021/0144902 | A1* | 5/2021 | Allgaier ............... A01B 69/003 |
| 2021/0333790 | A1* | 10/2021 | Kean .................... G05D 1/0016 |
| 2021/0340725 | A1* | 11/2021 | Velde ....................... G05G 5/12 |
| 2022/0066453 | A1 | 3/2022 | Sneyders et al. |
| 2022/0377963 | A1* | 12/2022 | Fay, II ................. A01B 69/004 |
| 2023/0085133 | A1* | 3/2023 | Johnson ............... A01B 69/007 |
| | | | 340/541 |
| 2023/0128959 | A1* | 4/2023 | Ito ........................ G05D 1/0297 |
| | | | 701/26 |
| 2024/0099176 | A1* | 3/2024 | Morimoto ........... A01B 69/008 |

OTHER PUBLICATIONS

Extended European Search Report for Application No. 23205160.7-1205, date of completion of the search Feb. 20, 2024, 17 pages.

* cited by examiner

100

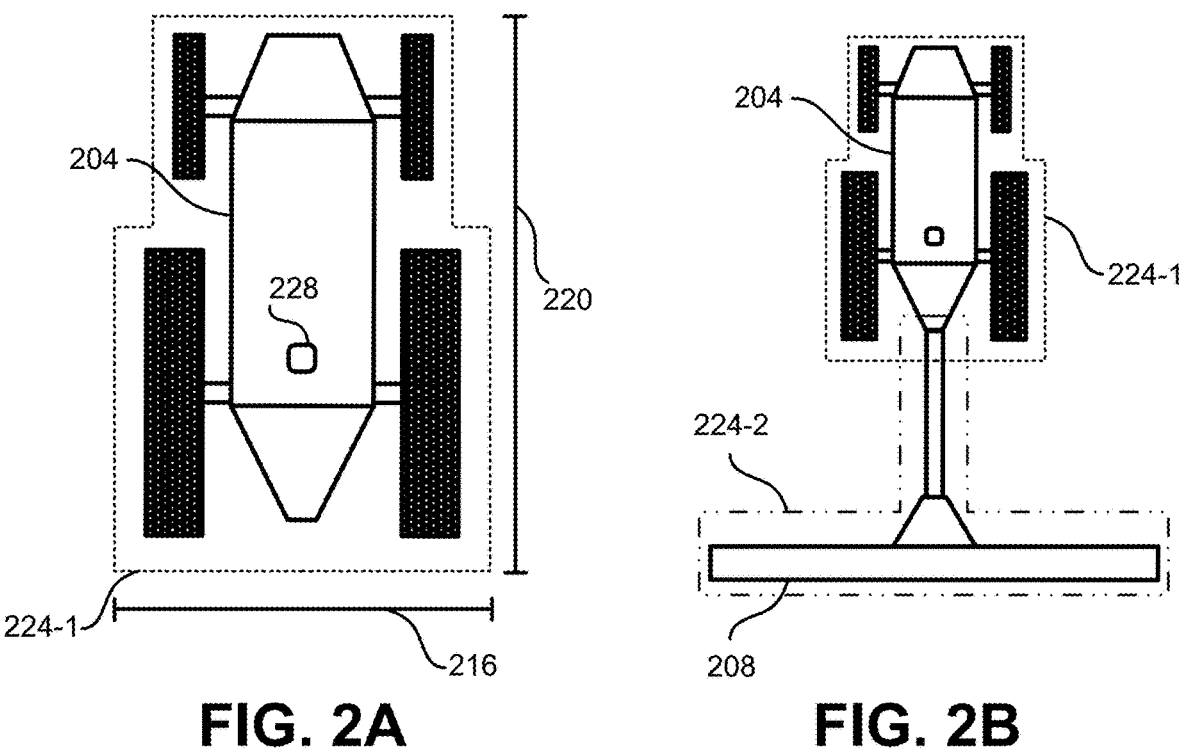
204
228
220
224-1
216
FIG. 2A
204
224-1
224-2
208
FIG. 2B
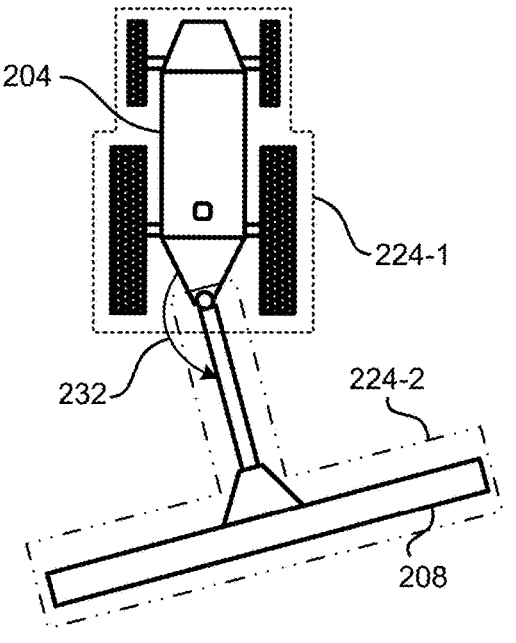
204
224-1
232
224-2
208
FIG. 2C
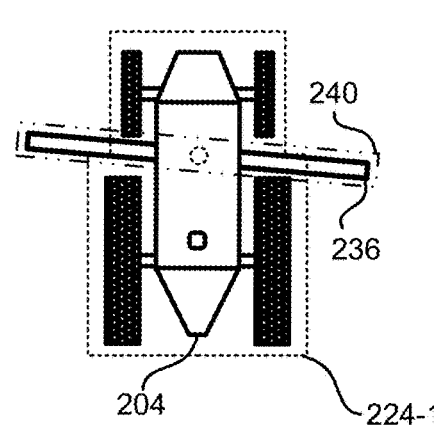
240
236
204
224-1
FIG. 2D

600

| Operator I/O Module | | Sensor Module | |
|---|---|---|---|
| User Terminal 608 | Vehicle Controls 612 | Position Sensors 620 | Implement Sensors 624 |
| | 604 | | 616 |

Control Module

Footprint Engine 632

Database 636

Geofence Gateway 640

628

Vehicle Electronic Control Unit

| Engine Control 648 | Brake Control 652 | Steering Control 656 | Implement Control 660 |
|---|---|---|---|

644

700

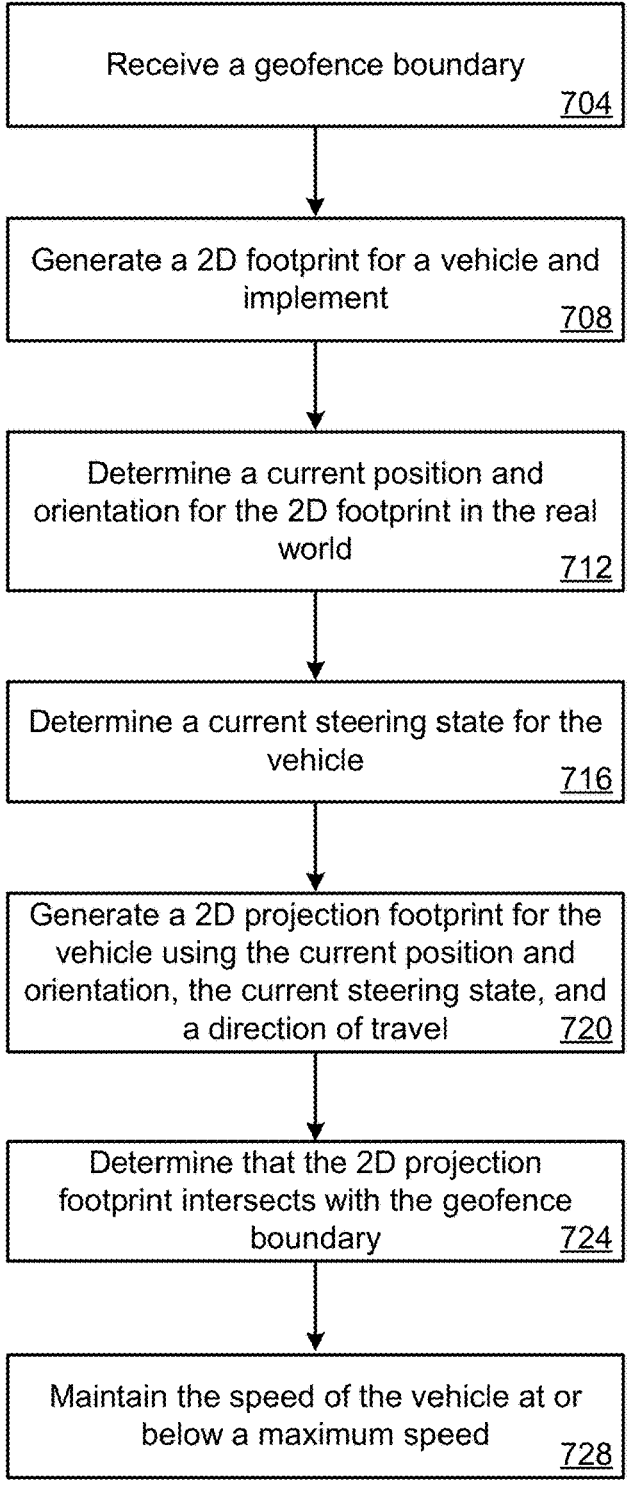

Receive a geofence boundary
704

Generate a 2D footprint for a vehicle and implement
708

Determine a current position and orientation for the 2D footprint in the real world
712

Determine a current steering state for the vehicle
716

Generate a 2D projection footprint for the vehicle using the current position and orientation, the current steering state, and a direction of travel     720

Determine that the 2D projection footprint intersects with the geofence boundary     724

Maintain the speed of the vehicle at or below a maximum speed
728

FIG. 7

AUTONOMOUS VEHICLE BOUNDARY INTERSECTION DETECTION AND AVOIDANCE

BACKGROUND

Heavy equipment, such as agricultural vehicles, construction vehicles, and the like operate in constrained environments with unique conditions, obstacles, hazards, and boundaries. In many cases, one or more implements, such as sprayers, graters, combines, and the like are connected to the heavy equipment to perform specialized functions within the environment. Due to the large sizes, unique shapes, and complex functions associated with the vehicles and associated implements, maintaining spatial awareness over the vehicles and implements may be challenging.

SUMMARY

Various embodiments are described related to autonomous vehicle boundary intersection detection and avoidance. In some embodiments, a method of maintaining an autonomous vehicle within geographic boundaries is described. The method may comprise receiving, at a display communicatively coupled to a control module of the autonomous vehicle, a geofence boundary. The method may further comprise generating, by the control module of the autonomous vehicle, a two-dimensional (2D) footprint using a definition of the autonomous vehicle and an implement coupled to the autonomous vehicle. The method may further comprise determining, from geographic coordinates of the autonomous vehicle, a current position and orientation for the 2D footprint in the real world. The method may further comprise determining a current steering state for the autonomous vehicle. The method may further comprise generating a 2D projection footprint for the autonomous vehicle using the current position and orientation, the current steering state, and a direction of travel of the autonomous vehicle. The method may further comprise determining that the 2D projection footprint intersects with the geofence boundary at a first distance from the current position and orientation. The method may further comprise maintaining the speed of the autonomous vehicle at or below a maximum speed determined based at least in part on the first distance.

In some embodiments, the 2D footprint represents the horizontal perimeter surrounding the autonomous vehicle and the implement coupled to the autonomous vehicle and the definition of the autonomous vehicle and the implement coupled to the autonomous vehicle includes a collection of horizontal dimensions associated with the autonomous vehicle and the implement, a relative orientation of the implement with respect to the autonomous vehicle, or both.

In some embodiments, the 2D footprint is generated by generating a 2D vehicle footprint representing the horizontal perimeter surrounding the autonomous vehicle. The 2D footprint may further be generated by generating a 2D implement footprint representing the horizontal perimeter surround the implement. The 2D footprint may further be generated by combining the 2D vehicle footprint with the 2D implement footprint. In some embodiments, the 2D vehicle footprint and the 2D implement footprint are combined by determining a relative orientation of the implement with respect to the autonomous vehicle and combining the 2D vehicle footprint with the 2D implement footprint with a same relative orientation as the relative orientation of the implement with respect to the autonomous vehicle.

In some embodiments, the method further comprises determining that a relative orientation of the implement with respect to the autonomous vehicle has changed and in response, modifying the 2D footprint based on the change in the relative orientation of the implement with respect to the autonomous vehicle. In some embodiments, the implement is freely coupled to the autonomous vehicle, and the method further comprises determining a relative orientation of the implement with respect to the autonomous vehicle using differential location measurements, orientation measurements, or both collected from one or more sensors coupled to the autonomous vehicle and one or more sensors coupled to the implement.

In some embodiments, the implement is controllably coupled to the autonomous vehicle by one or more attachment mechanisms, and the method further comprises determining a relative orientation of the implement with respect to the autonomous vehicle using measurements from the one or more attachment mechanisms. In some embodiments, the current steering state for the autonomous vehicle is determined by determining a steering type for the autonomous vehicle selected from a group of steering types consisting of: single axle steering, double axle steering, articulated steering, and track based or differential drive based steering, and receiving a current steering angle from a steering mechanism of the autonomous vehicle.

In some embodiments, the method further comprises generating an updated 2D projection footprint in response to determining that a position and orientation of the autonomous vehicle has changed. In some embodiments, the definition of the autonomous vehicle and an implement coupled to the autonomous vehicle includes one or more height measurements and the method further comprises generating a three-dimensional (3D) envelope and a 3D projection envelope using the one or more height measurements.

In some embodiments, a non-transitory processor-readable storage medium is described. The medium may comprise processor-readable instructions configured to cause one or more processors to receive, at a display communicatively coupled to a control module of an autonomous vehicle, a geofence boundary. The one or more processors may generate a two-dimensional (2D) footprint using a definition of the autonomous vehicle and an implement coupled to the autonomous vehicle. The one or more processors may determine, from geographic coordinates of the autonomous vehicle, a current position and orientation for the 2D footprint in the real world. The one or more processors may determine a current steering state for the autonomous vehicle. The one or more processors may generate a 2D projection footprint for the autonomous vehicle using the current position and orientation, the current steering state, and a direction of travel of the autonomous vehicle. The one or more processors may determine that the 2D projection footprint intersects with the geofence boundary at a first distance from the current position and orientation. The one or more processors may maintain the speed of the autonomous vehicle at or below a maximum speed determined based at least in part on the first distance.

BRIEF DESCRIPTION OF THE DRAWINGS

FIGS. 2A-2D illustrate embodiments of fixed and moveable implements at various attachment points on an autonomously driven vehicle.

FIG. 7 illustrates an embodiment of a method of operating an autonomously driven vehicle to avoid geographic boundaries.

Figure 1:
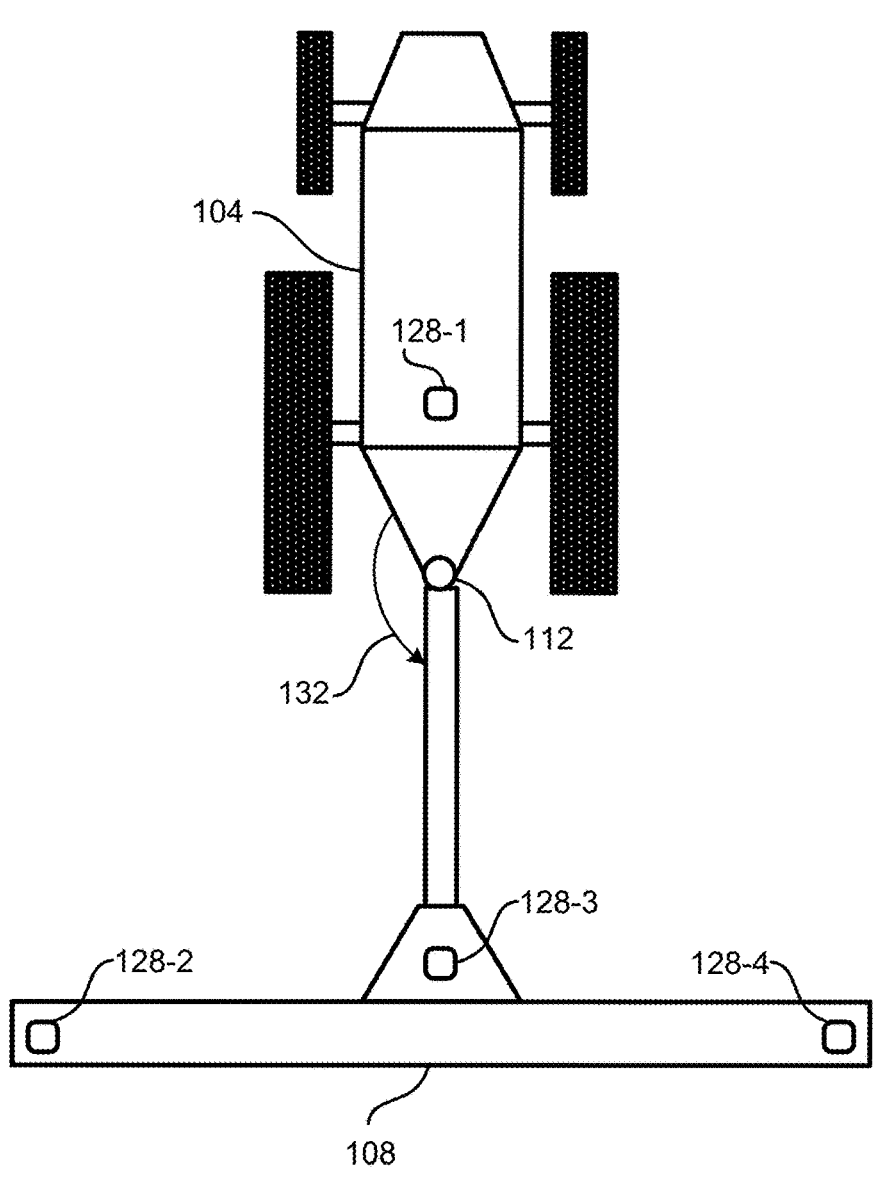
FIG. 1 illustrates an embodiment of an autonomously driven vehicle and implement system.

In the appended figures, similar components and/or features may have the same numerical reference label. Further, various components of the same type may be distinguished by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Autonomous and semi-autonomous driving solutions may provide numerous benefits across a wide range of industries and for various types of vehicles. In the agricultural and construction contexts, autonomous and semi-autonomous driving solutions may independently control vehicles, provide control adjustments, and/or present feedback to operators in order to maintain the vehicle on a predefined route or to begin and end operation of one or more functions of the vehicle at predefined locations along the route.

While such solutions may improve efficiency and affordability associated with efficient route planning and execution, autonomous and semi-autonomous driving solutions may benefit from additional safeguards to prevent vehicle operation outside of predefined boundaries. Such safeguards can include detecting that a vehicle is within close proximity to a boundary and slowing or stopping the vehicle to avoid an intersection or collision. However, slowing or completely stopping a vehicle merely because it is within close proximity to a boundary may lead to unnecessary speed reductions and/or unsafe stopping conditions. For example, the speed of a vehicle traveling close to, and parallel with, a boundary may be unduly reduced even though an intersection with the boundary is not necessarily inevitable. As another example, a vehicle approaching a boundary at a high speed may be forced to decelerate at a potentially unsafe, or even impossible, rate of deceleration if precautions are not taken until the vehicle is within close proximity to the boundary. Embodiments described herein address these and other unique challenges associated with autonomous and semi-autonomous driving solutions.

In some embodiments, a projection footprint for a vehicle, as well as any implements attached thereto, is generated based at least in part on the current position, orientation, steering state, and relative orientation of any implements coupled to the vehicle. Using the projection footprint to predict the horizontal space a vehicle and/or implement will occupy in the future given its current operating status, a potential intersection with a boundary or other hazard may be predicted before it occurs. Based on the distance from the current position of the vehicle to the predicted intersection, a safe operating speed may be maintained that will allow the vehicle to come to a complete stop using a safe deceleration rate before the intersection occurs.

Further detail regarding such embodiments and other embodiments is provided in relation to the figures. FIG. 1 illustrates an embodiment of an autonomously driven vehicle and implement system ("System 100"). System 100 may include vehicle 104 and implement 108. System 100 may be used for agriculture, construction, commercial transportation, personal transportation, or similar purposes. For example, in agricultural contexts, system 100 may be used for, among other purposes, soil preparation (e.g., tilling, fertilizing, irrigating, etc.), liquid and/or solids applications (e.g., watering, fertilizing, etc), and/or harvesting activities. As another example, in construction contexts, system 100 may be used for, among other purposes, site clearing, soil removal/replacement, leveling, grating, and the like.

Vehicle 104 may be a general and/or multi-purpose vehicle. For example, vehicle 104 may be a tractor configured to deliver a high tractive effort (i.e., torque) at slow speeds to haul heavy loads, such as trailers and other heavy machinery (e.g., referred to herein as "implements") used in agriculture, mining, construction, and the like to perform various functions. Additionally, or alternatively, vehicle 104 may be a special and/or single-purpose vehicle configured to perform a select number of tasks and/or operate in a select number of environments. For example, vehicle 104 may be an excavator configured to operate a boom and one or more attachments, such as a bucket, an auger, a claw, and the like. As another example, vehicle 104 may be a combine harvester including one or more implements configured to reap, thresh, gather, and/or winnow crops.

Vehicle 104 may be operably coupled to one or more types of implements, such as implement 108. Implement 108 may be a machine, device, and/or attachment that configures vehicle 104 to perform a particular function. For example, in the agricultural context, implement 108 may be a plow, ripper, planter, applicator, drill, and the like. As another example, in the construction context, implement 108 may be a grater, leveler, blade, roller, boom, bucket, and the like.

Implement 108 may be coupled to vehicle 104 at attachment point 112. While illustrated and described as being coupled to a rear of vehicle 104, implement 108 may be coupled to any suitable location on vehicle 104. For example, implement 108 may be coupled to a front or a side of vehicle 104. The location at which implement 108 is coupled to vehicle 104 may depend on the particular purpose of implement 108. Additionally, or alternatively, vehicle 104 may be operably coupled to multiple implements. For example, vehicle 104 may be operably coupled to implements on a front and a rear, a left side and a right side, or any combination of two or more sides of vehicle 104.

In some embodiments, attachment point 112 allows implement 108 to pivot freely with respect to vehicle 104. For example, attachment point 112 may be a tow hitch (e.g., a ball hitch), a drawbar, or the like. In some embodiments, attachment point 112 restricts the movement of implement 108 with respect to vehicle 104. For example, implement 108 may be coupled to vehicle 104 in a fixed position and/or orientation with respect to vehicle 104. Additionally, or alternatively, attachment point 112 may be configured to move implement 108 with respect to vehicle 104. For example, as illustrated, attachment point 112 may be configured to maintain implement 108 at a fixed or adjustable angle 132. In some embodiments, multiple attachment points are used to couple one or more components of implement 108 to vehicle 104. For example, an excavator may include a first controllable attachment point between a cab of the excavator and a first segment of a boom, a second controllable attachment point between the first segment of the boom and a second segment of the boom, and a third controllable attachment point between the second segment of the boom and an attachment (e.g., bucket). As another example, a tractor may be coupled to an implement, such as a crop sprayer or till, by a first attachment point, and two arms of the implement may be coupled at a central point by two adjustable attachment points configured to separately raise and lower their respective arms.

Vehicle 104 may include one or more location sensors 128, such as location sensor 128-1. Location sensors 128 may be permanently or semi-permanently installed on vehicle 104 at one or more known locations. Location sensors 128 may include any combination of one or more sensors configured to determine a three-dimensional position in space. For example, location sensors 128 may include satellite receivers configured to detect positioning signals from global navigation satellite systems (GNSS), such as the Global Positioning System (GPS). In some embodiments, location sensors 128 include one or more sensors, a sensor system, and/or one or more receivers, configured to triangulate positions using one or more distance measurements. For example, location sensors 128 may include any number of Light Detection and Ranging (Lidar), radar, ultrasonic, infrared, or other sensors, and associated processing resources, configured to triangulate a position using distance measurements to one or more objects, such as local positioning system (LPS) beacons, within close proximity to location sensors 128. Location sensors 128 may output geographic coordinates corresponding to the location of the sensor in the real world. Additionally, or alternatively, location sensors 128 may output coordinates relative to a virtual reference frame or origin, such as a fixed point on vehicle 104 and/or implement 108.

Additionally, or alternatively, location sensors 128 may include one or more motion sensors (e.g., accelerometers, magnetometers, and/or gyroscopes) to determine a three-dimensional position and/or geographic coordinates, using an inertial navigation system (INS). For example, after determining a starting position, an INS may determine subsequent position information based on movement measurements. Additionally, or alternatively, motion sensors may be used to augment positional information. For example, using a magnetometer with a known orientation with respect to vehicle 104, a heading of vehicle 104 may be determined. As another example, one or more gyroscopes may be used to determine an orientation of vehicle 104 (e.g., pitch, roll, yaw) in the real world.

In some embodiments, implement 108 may include one or more location sensors 128, such as location sensor 128-2, location sensor 128-3, and location sensor 128-4. Location sensors 128 coupled to implement 108 may be used to determine one or more positions of various points on implement 108. For example, location sensor 128-2 and location sensor 128-4 may be used to monitor the location of the outermost points on implement 108. Additionally, or alternatively, location sensors 128 coupled to implement 108 may be used to determine a relative orientation of implement 108 with respect to vehicle 104. For example, by comparing a first location determined from location sensor 128-1 coupled to vehicle 104, a second location determined from location sensor 128-3 coupled to implement 108, and a heading of vehicle 104, the relative orientation of implement 108 with respect to vehicle 104 may be determined, as described further below. Additionally, or alternatively, angle 132 output from a control mechanism or sensor assembly coupled to attachment point 112 may be used to determine the relative orientation of implement 108 with respect to vehicle 104.

FIGS. 2A-2D illustrate embodiments of fixed and moveable implements at various attachment points on an autonomously driven vehicle. As illustrated, embodiments include vehicle 204 and optionally implement 208. Vehicle 204 and/or implement 208 may be the same, or function in a similar manner, as vehicle 104 and/or implement 108 described above.

FIG. 2A illustrates vehicle 204 with no implement attached thereto. The physical space occupied by vehicle 204 and/or implement 208 may be defined by one or more vehicle footprints, such as footprints 224, and/or one or more envelopes. Vehicle footprints may be two-dimensional representations of a vehicle and any implements attached thereto as a top-down projection onto a horizontal surface. For example, as illustrated, a two-dimensional vehicle footprint may represent the horizontal perimeter surrounding vehicle 204 and/or implement 208. Envelopes may be three-dimensional representations of a vehicle including the horizontal space occupied by a vehicle and/or implement, as well as the vertical space occupied by a vehicle and/or implement. Embodiments described herein with reference to two-dimensional footprints may be equally applicable to three-dimensional envelopes.

A vehicle footprint may be defined using one or more measurements associated with a vehicle. For example, a circular footprint may be defined using a single measurement representing the distance from a center of vehicle 204 to the farthest point on vehicle 204 from the center. As another example, and as partially illustrated in FIG. 2A, a rectangular footprint may be defined using width 216 and length 220 of vehicle 204. Similar width and length measurements associated with implement 208 may be used to define a separate, or combined, vehicle footprint associated with vehicle 204 and/or implement 208. Additional measurements corresponding to major features of a vehicle and/or implement may be used to define vehicle footprints with more complex shapes including concave or convex polygons, ovals, and the like.

For example, vehicle footprints may be polygons with three or more vertices that are connected, and closed, by edges of various lengths. Similarly, three-dimensional envelopes may be polyhedrons with four or more vertices. The number of vertices and corresponding edges/faces may be selected to achieve a desired level of accuracy and/or fidelity. Selecting additional vertices corresponding to additional points on a vehicle's exterior may provide a more accurate representation of the actual perimeter of the vehicle. For example, as illustrated, footprint 224-1 for vehicle 204 includes eight vertices connected by edges of varying lengths. Compared with a simple rectangular footprint defined using only width 216 and length 220 of vehicle 204, footprint 224-1 may provide a more accurate representation of the perimeter of vehicle 204. As another example, compared with a tetrahedron, a cube may more accurately represent the three-dimensional shape of vehicle 204.

In some embodiments, the vertices of a vehicle footprint are defined using two dimensional coordinates of a reference frame. Additionally, or alternatively, vertices may be defined using three-dimensional coordinates of a reference frame. The origin of the reference frame may be defined with respect to a reference point on the vehicle. For example, location sensor 228 may be used as the origin for defining footprint 224-1 of vehicle 204. Similarly, location sensors coupled to implement 208, as described above, may be used as the origin for footprint 224-2 of implement 208. Using the geographic coordinates for the location sensor, and a heading of the vehicle, a current position and orientation for a footprint or envelope in the real world may be determined.

In some embodiments, vehicle footprints and/or envelopes are dynamically defined based on one or more moveable or articulating features of a vehicle. For example, a vehicle footprint for a vehicle with articulated steering, as described further herein, may be dynamically defined based on a current state of the articulated steering system. In other words, the vehicle footprint for vehicles with moveable features may change dynamically based on a current orientation of one or more components of the vehicle with respect to other components of the vehicle as maintained by the moveable feature. As another example, a vehicle footprint for an excavator may change dynamically as the cab of the excavator rotates around a vertical axis with respect to a base (e.g., the tracks) of the excavator. As yet another example, a vehicle envelope for a dump truck may change dynamically as the bed of the dump truck is raised to pour out its contents. In some embodiments, vehicle footprints for vehicles with moveable/articulating features are defined based on the total physical space occupiable by such vehicle. For example, a circular footprint for an excavator may be defined by rotating a rectangular footprint defined by the excavator's most compact footprint around the axis of rotation of the excavator.

In some embodiments, vehicle footprints are defined using multiple sub-footprints. For example, FIG. 2B illustrates vehicle 204 with implement 208 coupled to vehicle 204 in a fixed orientation with respect to vehicle 204. By joining footprint 224-1 of vehicle 204 and footprint 224-2 of implement 208 at their intersections, an overall vehicle footprint may be defined. Similar unions between vehicle envelopes and implement envelopes may also be performed. While illustrated and described herein as a combination of two footprints representing a vehicle and a single implement, additional footprints may be combined based on the number and orientation of additional implements attached to the vehicle. Additionally, or alternatively, a single footprint or envelope may be defined for vehicles with implements permanently, or semi-permanently, coupled to the vehicle. Similar to vehicle footprints for vehicles with moveable/articulating features, implement footprints for implements capable of moving with respect to a vehicle may be defined based on the total physical space occupiable by such implement. For example, an implement envelope for an excavator boom/attachment may be defined based on the working range of the excavator boom/attachment.

Using separate footprints and/or envelopes to define an overall vehicle footprint and/or envelope for vehicles and implements may facilitate modifications to the overall vehicle footprint and/or envelope as the relative orientation between the vehicle and implement changes. For example, FIG. 2C illustrates vehicle 204 with implement 208 movably coupled to vehicle 204 in one of a plurality of possible relative orientations with respect to vehicle 204 (e.g., depending on angle 232). Based on the relative orientation of implement 208 with respect to vehicle 204 (e.g., as determined from angle 232), a combined vehicle footprint may be modified by adjusting the orientation of footprint 224-2 of the implement 208 with respect to footprint 224-1 of vehicle 204 based on the relative orientation of implement 208 with respect to vehicle 204. Similarly, the combined vehicle footprint may be modified as either the vehicle footprint or the implement footprint is modified. For example, as described above, the combined footprint for a vehicle with articulating steering coupled to an implement may be updated based on a current steering state. As another example, the combined footprint for an excavator vehicle and boom implement may be updated based on one or more relative orientations between segments of the boom and/or an attachment coupled to an end of the boom.

In some embodiments, defining an overall footprint and/or envelope for a vehicle and implement includes determining where the implement is coupled to the vehicle in relation to the vehicle. For example, FIG. 2D illustrates vehicle 204 with implement 236 coupled at, or near, a center of vehicle 204. The location at which implement 236 is coupled to vehicle 204 may be associated with a known location in relation to footprint 224-1. Based on the known location at which implement 236 is coupled to vehicle 204 in relation to footprint 224-1, footprint 240 may be accurately positioned at the known location in relation to footprint 224-1. The overall footprint for vehicle 204 and implement 236 may then be defined based on the union of footprint 224-1 and footprint 240.

While illustrated and described above as being a static footprint defined by a stationary vehicle and/or implement, vehicle footprints and/or envelopes may also be used to define the physical space that a vehicle and/or implement will occupy in the future. In some embodiments, a two-dimensional projection footprint and/or a three-dimensional projection envelope is defined by the physical space occupied by a footprint and/or envelope along a path between a current position and orientation of the footprint and/or envelope and a future position and orientation of the footprint and/or envelope. The future position and orientation may be determined by following a path defined by a current steering state of the vehicle along a direction of travel of the vehicle from the current position and orientation for a predefined distance. Additionally, or alternatively, the future position and orientation may be determined by following a path from the current position and orientation of the vehicle and/or implement along a direction of movement relative to either or both of the vehicle and implement. For example, as an excavator cab rotates around its vertical axis, a projection footprint may be determined from rotating its current footprint around the vertical axis. As another example, as an excavator boom is extended or lifted, its projection footprint and/or envelope may be determined by extending or raising its current footprint and/or envelope. As described above, the current position and orientation may be determined using one or more sensors coupled to the vehicle, such as location sensors 128, and/or sensors configured to determine a current orientation of an attachment point. The current steering state may be determined based on the type of steering mechanism of the vehicle and one or more current steering angles for the steering mechanism, as described further below.

FIGS. 3A-3D illustrate embodiments 300 of autonomously driven vehicles with various steering systems. As illustrated, embodiments 300 include vehicles 304. As further described above, the physical space occupied by vehicles 304 may be defined by footprints 324 and/or envelopes. Headings 308 may indicate the direction in which vehicles 304 are oriented. A bearing may indicate the direction in which vehicles 304 are actually moving. In some embodiments, headings 308 and/or bearings include compass headings indicating the direction in which an axis of movement is aligned and/or moving. Bearings may further include rotational directions (e.g., clockwise or counterclockwise) relative to an axis, as in the case of an excavator cab rotating around its vertical axis and/or an implement being raised or lowered relative to a horizontal axis. The axis of movement may be parallel to a longitudinal axis, parallel to one or more tracks, and/or perpendicular to one or more axles, of vehicles 304. In some embodiments, headings 308 and/or bearings indicate a velocity and/or magnitude of acceleration of vehicles 304. For example, a bearing may indicate that a vehicle is traveling forward or backward at a constant or dynamic speed.

At any point in time, vehicles 304 may be associated with a steering state. A steering state may describe one or more permanent or semi-permanent characteristics of a vehicle's steering system. Permanent or semi-permanent characteristics may include such information as the number of axles coupled to the vehicle, the number of wheels coupled to each axle, the sizes of each of the wheels, the distance between axles (e.g., the wheelbase or distance between a front axle and a rear axle), the track width between wheels on a same axle or between parallel sets of continuous tracks, and the like. Steering state may additionally, or alternatively, describe dynamic characteristics of a vehicle's steering system. For example, steering state may indicate a current steering angle for one or more steering mechanisms. A steering angle may indicate the angular offset of one or more wheels with respect to a reference position, angle, or direction, such as heading 308. The reference position may be a position of the wheels that enables the vehicle to move along a straight path. As another example, steering state may indicate the relative speeds and/or directions of rotating tracks, opposing sets of wheels, and the like, for track-based, or differential drive based vehicles. Based on the relative speeds and/or directions, a steering curvature, or bearing, may be determined for differential drive based steering systems indicating the approximate curvature of a path produced by such relative speeds/directions with respect to a straight path.

Based at least in part on a current position, heading 308, and a current steering state, a predicted path 312 for vehicles 304 may be determined. The predicted path 312 may be indicative of the bearing. The predicted path 312 may extend for a predefined or predetermined distance. For example, the predicted path 312 may extend for 5, 10, 20, 100, or more feet from a current position. As another example, the predicted path 312 may extend until the path intersects with a boundary line, such as a circular buffer region around vehicle 304 with a predefined radius. In some embodiments, the distance is based on a current stopping distance or threshold for vehicle 304 from a current speed. For example, based on a current speed and maximum or safe braking force of vehicle 304, a calculated distance within which vehicle 304 is able to come to a complete stop from the current speed may be used as the predetermined distance. The maximum or safe braking force of vehicle 304 may be defined by the overall braking abilities of vehicle 304. Additionally, or alternatively, the maximum or safe braking force may be predefined based on a maximum deceleration rate determined based on one or more criteria such as operator safety, vehicle and/or implement structural integrity, and the like.

After, or concurrently with, determining the predicted path 312 of vehicle 304, projection footprint 316 may be determined based on the predicted path 312 and footprint 324. As explained above, a two or three-dimensional projection footprint may be defined by the horizontal space occupied by a two or three-dimensional footprint along a continuous path between a current position and orientation of the footprint and a future position and orientation of the footprint. The future position and orientation may be determined from the position and orientation of the vehicle at the end of a predicted path, such as path 312.

Figures 3A, 3B, 3C, 3D:
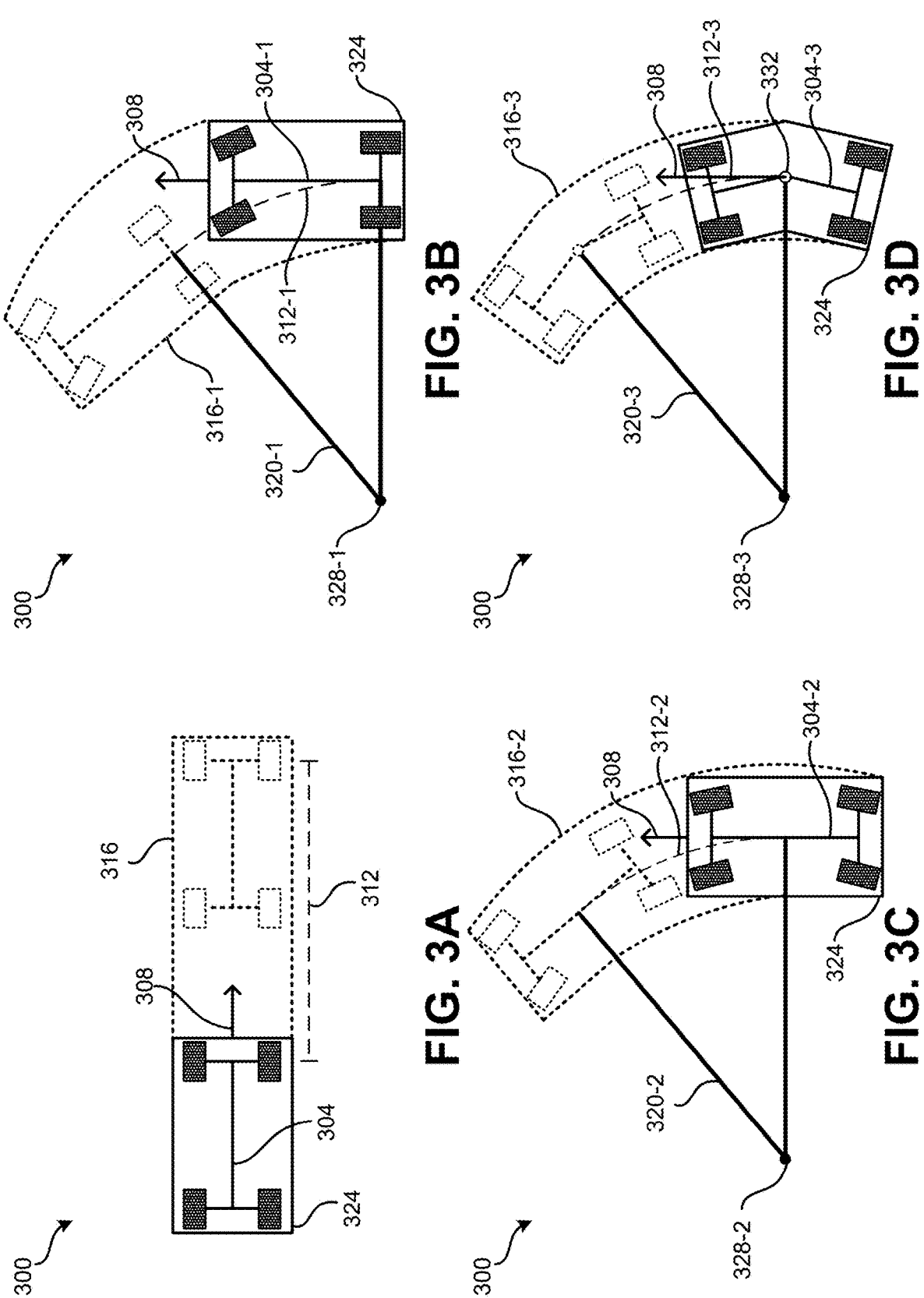
FIGS. 3A-3D illustrate embodiments of autonomously driven vehicles with various steering systems.

FIG. 3A illustrates projection footprint 316 for vehicle 304 with a current steering angle aligned with heading 308. In some embodiments, path 312 and/or projection footprint 316 are determined from heading 308 and a current steering angle. For example, as illustrated, a current steering angle aligned with heading 308 will produce a substantially straight path 312. Determining projection footprint 316 for a substantially straight path 312 may include extending footprint 324 along a single axis aligned with heading 308. For current steering angles that are not aligned with heading 308, path 312 and/or projection footprint 316 may be further based on the steering system of vehicle 304.

FIG. 3B illustrates projection footprint 316-1 for vehicle 304-1 with a single axle steering system. As illustrated, vehicle 304-1 includes a steering axle capable of altering the direction or angle of wheels attached thereto, and a non-steering axle with wheels coupled thereto in a fixed, or semi-fixed, orientation with respect to heading 308. As further illustrated, vehicle 304-1 is predicted to follow a curved path 312-1 based on the current steering angle of the front wheels with respect to heading 308 of vehicle 304-1. The current steering angle may also be used to determine turn radius 320-1 of the curved path 312-1 from center of turn 328-1 to a middle point on the rear axle of vehicle 304-1. Additionally, or alternatively, turn radius 320-1 may be determined based on a currently estimated yaw rate and velocity, as measured by one or more motion and/or location sensors coupled to vehicle 304-1. Based on curved path 312-1, projected footprint 316-1 may be determined. While described as a having a front wheel steering system, the concepts described in relation to vehicle 304-1 can also apply to a rear wheel steering system.

FIG. 3C illustrates projection footprint 316-2 for vehicle 304-2 with a double axle steering system. As illustrated, vehicle 304-1 includes two steering axles, each capable of altering the direction or angle of wheels attached thereto with respect to heading 308. As further illustrated, vehicle 304-2 is predicted to follow a curved path 312-2 based on the current steering angles of the front wheels and the rear wheels with respect to heading 308 of vehicle 304-1. The current steering angles may also be used to determine turn radius 320-2 of the curved path 312-2 from center of turn 328-2 to a point on a center axis bisecting the front and rear axles of vehicle 304-2. The point on the center axis may be determined based on the independent angles of the front and rear wheels. For example, and as illustrated, the point on the center axis may coincide with the point at the middle of the wheelbase when the current steering angles of the front and rear axles have the same absolute value. As another example, when the wheels on either the front axle, or the rear axle, are aligned with heading 308, turn radius 320-2 of curved path 312-2 will extend from center of turn 328-2 to a middle point on the axle aligned with heading 308, similar to a single axle steering system described above.

FIG. 3D illustrates projection footprint 316-3 for vehicle 304-3 with an articulated steering system. As illustrated, the front and rear axles of vehicle 304-3 are separated by pivot point 332. Each wheel of vehicle 304-3 may be in a predefined orientation relative to the respective axle to which they are coupled. For example, the rotational axis of each wheel may be parallel to the respective axle. Pivot point 332 may enable vehicle 304-3 to steer by changing the relative angle of the front and rear axles with respect to each other. Heading 308 for vehicle 304-3 may be defined with respect to a front of vehicle 304-3 and/or a particular axle (e.g., perpendicular to the front axle) of vehicle 304-3.

The current steering angle for vehicle 304-3 may be obtained from pivot point 332. For example, the current steering angle may be defined by the relative angle of the front and rear axles with respect to each other provided by pivot point 332. As further illustrated, vehicle 304-3 is predicted to follow a curved path 312-3 based on the current steering angle of pivot point 332. The current steering angle of pivot point 332 may be used to determine turn radius 320-3 of the curved path 312-3 from center of turn 328-3 to pivot point 332 of vehicle 304-3.

While illustrated and described above in reference to a vehicle without an implement, similar path and projection footprint determinations may be made for one or more implements coupled to vehicles 304, as illustrated and described below. For example, projection footprints for a vehicle coupled to one or more implements may be based on one or more characteristics associated with the one or more implements in addition to the heading and the current steering states, such as: the location on the vehicle at which the implement is coupled; whether the one or more implements are coupled to the vehicle in a fixed orientation; the additional wheelbase associated with a towed implement; the current steering state of a steerable towed implement; the current movement of an implement; and the like. As another example, projection footprints for an implement in motion (e.g., an excavator arm/boom) may be based on the direction of movement with respect to an attachment point as determined from location sensors on the implement, attachment mechanism control signals and/or sensors, and the like. In yet another example, projection footprints for vehicles capable of changing orientation with little to no change in position/location (e.g., articulated vehicles, continuous track vehicles, excavators, and the like) may be determined based on the direction of movement.

Figure 4:
FIG. 4 illustrates an exemplary environment in which an autonomously driven vehicle may be controlled to avoid boundaries.

FIG. 4 illustrates an exemplary environment 400 in which an autonomously driven vehicle may be controlled to avoid boundaries. Environment 400 may include an agricultural field, construction site, warehouse, parking lot, park, or other similar region or area. Environment 400 may include one or more boundaries 410. Boundaries 410 may encompass or define a sub-area or sub-region within environment 400. For example, boundary 410-1 may be an external perimeter of environment 400 surrounding a particular crop, field, property line, neighborhood, factory area, and the like. Boundaries 410 may correspond to actual physical structures, such as walls, fences, shorelines, rivers, streams, elevation changes, and the like. Additionally, or alternatively, boundaries 410 may correspond to virtual boundaries defined for logical, legal, commercial, strategic, agricultural, or other similar purposes. In some embodiments, boundaries 410 are the same, or function in a similar manner as, geofence boundaries. While described herein as 2-D boundaries (e.g., a surface boundary), boundaries 410 may include a third dimension associated with height or elevation, as described further in reference to FIGS. 5A & 5B. For example, a boundary defined for a bridge may include a maximum height or elevation with respect to the ground, sea-level, or other reference elevation.

Boundaries 410 may be areas or zones within which activities and/or vehicles are to be confined. For example, boundary 410-1 may indicate that one or more activities and/or vehicles should stay within boundary 410-1. Additionally, or alternatively, boundaries 410 may be areas or zones from which activities and/or vehicles are to be excluded. For example, boundary 410-2 may be a restricted or hazardous region in environment 400 within which activities are not to take place and/or vehicles are not to enter. While illustrated and described as being closed perimeters, boundaries 410 may include open geometries, such as a line between two points with or without a maximum height or elevation (e.g., in the case of a bridge).

Boundaries 410 may include a collection of coordinates 414 connected by straight and/or curved lines. Coordinates 414 may be geographic coordinates represented using one or more spatial or coordinate reference systems, such as the geographic coordinate system, Universal Transverse Mercator, military grid reference system, geocentric coordinate system, and the like. Additionally, or alternatively, coordinates 414 may be defined in reference to an arbitrary coordinate system defined for a particular space. For example, a cartesian coordinate system may be applied to a region or area (e.g., a factory floor, a field, etc.) with the origin of the coordinate system set at a known location (e.g., a corner or center of the factory floor).

Collections of coordinates 414 may be connected in sequence by straight and/or curved lines to form boundaries 410. For example, as illustrated, coordinate 414-1, coordinate 414-2, and coordinate 414-3 are connected to form boundary 410-1. Additionally, or alternatively, boundaries 410 may include coordinates 414 and one or more measurements. For example, as illustrated, the center of boundary 410-2 may be defined using coordinate 414-4. Boundary 410-2 may be further defined by radius 415 from geographic coordinate 414-4 to form a circular boundary.

One or more vehicles may be operated in environment 400, such as vehicle 404. Vehicle 404 may be the same, or function in a similar manner, as vehicle 104 described above. For example, vehicle 404 may be an agricultural vehicle, such as a tractor, combine, sprayer, and the like. As another example, vehicle 404 may be a construction vehicle, such as an excavator, dump truck, bulldozer, crane, compactor, and the like. Vehicle 404 may be coupled to one or more implements, such as implement 408. Implement 408 may be the same, or function in a similar manner, as implement 108 described above. For example, implement 408 may be a machine or device that configures vehicle 404 to perform a particular function, such as a ripper, sprayer, combine, and the like. As described above, a two-dimensional footprint 424 may be generated to represent the horizontal perimeter of vehicle 404 and implement 408. Additionally, or alternatively, a three-dimensional envelope including the vertical features of vehicle 404 and/or implement 408 may be generated.

Vehicle 404 may move through environment 400 as necessary to accomplish one or more functions, such as plowing, sowing, spraying, harvesting, reaping, and the like. The movement of vehicle 404 may be autonomously, or semi-autonomously, controlled by a combination of human and/or computer inputs. For example, as described further below, one or more control modules may govern the movement and operation of vehicle 404 and/or implement 408 within environment 400.

As vehicle 404 moves through environment 400, current and future positions and orientations 420 may be determined, as described above. For example, as illustrated, current position and orientation 420-1 may be determined for vehicle 404 based on information collected by one or more sensors as described above. Current position and orientation 420-1 may include geographic coordinates for a location sensor coupled to vehicle 404, a current heading and steering state, and relative orientation of implement 408 with respect to vehicle 404.

As described above, future position and orientation 420-3 may be determined by following path 412 defined by the current steering state of vehicle 404 along a direction of travel or movement from current position and orientation 420-1. Path 412 may be separated between current and future positions and orientations 420 to indicate intermediate positions and orientations. For example, as illustrated, path 412 may be separated into path 412-1 between current position and orientation 420-1 and intermediate position and orientation 420-2, and path 412-2 between intermediate position and orientation 420-2 and future position and orientation 420-3. Embodiments described herein are primarily with respect to horizontal movement, however such embodiments may also be applicable to vertical movement, as in the case of implements capable of being raised or lowered.

As further described above, two-dimensional projection footprint 416 may be generated to represent the horizontal space vehicle 404 and/or implement 408 will occupy along path 412 between current position and orientation 420-1 and future position and orientation 420-3. Comparing two-dimensional projection footprint 416 with boundaries 410, it may be determined whether, when, and/or where two-dimensional projection footprint 416, and therefore vehicle 404 and/or implement 408, will intersect with boundaries 410. For example, as illustrated, it may be determined that after traveling the distance of path 412 from current position and orientation 420-1 to future position and orientation 420-3, implement 408 will intersect with boundary 410-1 at point 432 unless evasive, or precautionary, actions are taken. As another example, it may be determined that the projection footprint for an excavator rotating about a vertical axis at current position and orientation 420-1 will intersect with a boundary unless precautionary actions are taken.

In some embodiments, evasive, or precautionary, actions include adjusting and/or limiting maximum speed 428 of vehicle 404. For example, based on the distance between current position and orientation 420-1 and future position and orientation 420-3 along path 412, maximum speed 428-1 (e.g., 30 miles per hour) from which vehicle 404 can come to a complete stop before reaching future position and orientation 420-3 may be calculated. A control module, as described further below, may then proceed to reduce, or otherwise limit the current speed of vehicle 404 to maximum speed 428-1 based on the calculation. As another example, based on a distance between current position and orientation 420-1 and the boundary between coordinate 414-1 and coordinate 414-3, a maximum rotational speed of vehicle 404 and/or implement 408 (e.g., an excavator and/or excavator boom) from which the rotation can come to a complete stop before intersecting the boundary may be calculated.

As vehicle 404 continues along path 412 toward future position and orientation 420-3, maximum speed 428 may be further adjusted and/or limited. For example, based on the lesser distance from intermediate position and orientation 420-2 to future position and orientation 420-3 along path 412-2, a reduced maximum speed 428-2 (e.g., 15 miles per hour) may be calculated and applied to vehicle 404. Maximum speed 428 of vehicle 404 may continuously, or intermittently, be reduced as vehicle 404 approaches future position and orientation 420-3 until maximum speed 428-3 (e.g., 0 miles per hour) is achieved prior to implement 408 intersecting with boundary 410-1.

In some embodiments, the maximum speed is based on a predetermined deceleration rate threshold. For example, maximum speed 428-1 may be the maximum speed from which vehicle 404 can come to a complete stop before reaching future position and orientation 420-3 without exceeding the predetermined deceleration rate threshold. The predetermined deceleration rate threshold may be selected based on one or more criteria, such as the safety of human occupants, current site conditions affecting traction (e.g., surface makeup and moisture content), physical constraints associated with implements (e.g., the maximum load sustainable by an implement attachment point), and the like.

In some embodiments, the evasive, or precautionary, actions include adjusting the current steering state of vehicle 404. For example, the current steering state or motion of vehicle 404 may be adjusted at the least possible distance before future position and orientation 420-3 that will allow vehicle 404 and/or implement 408 to avoid intersection with boundary 410-1. Additionally, or alternatively, precautionary actions may include adjusting the relative orientation of implements with respect to the vehicle. For example, an attachment point for implement 408 may adjust the relative angle of implement 408 with respect to vehicle 404 prior to vehicle 404 reaching future position and orientation 420-3. As another example, an extendable implement may be retracted prior to any intersection with boundaries.

Figures 5A, 5B:
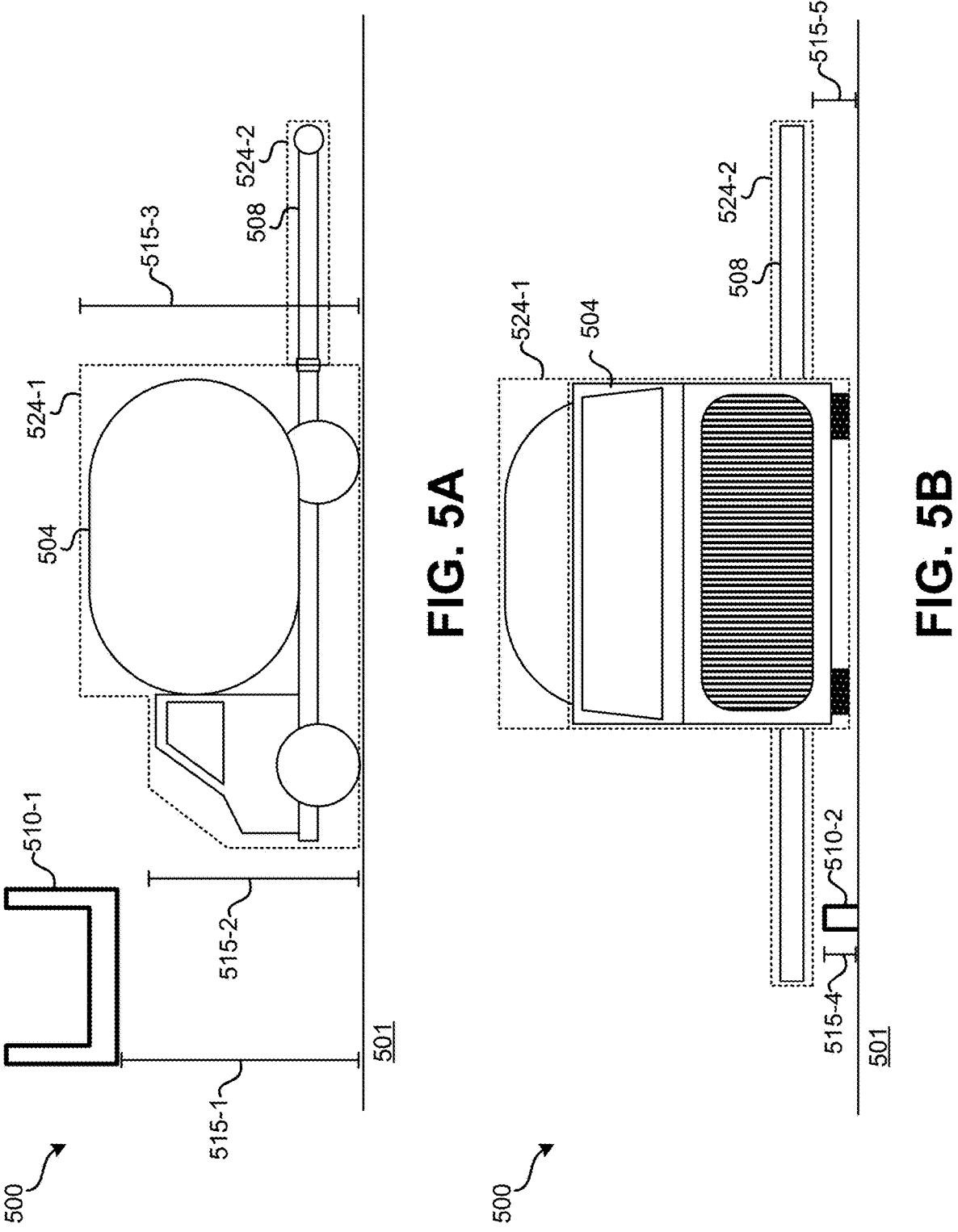
FIGS. 5A & 5B illustrate side and front views of another exemplary environment in which an autonomously driven vehicle may be controlled to avoid boundaries.

FIGS. 5A & 5B illustrate side and front views of another exemplary environment 500 in which an autonomously driven vehicle may be controlled to avoid boundaries. Environment 500 may include an agricultural field, construction site, warehouse, parking lot, park, or other similar region or area with surface 501. One or more vehicles may be operated in environment 500, such as vehicle 504. Vehicle 504 may be the same, or function in a similar manner, as vehicle 104 and/or vehicle 404 described above. For example, vehicle 504 may be an agricultural vehicle, such as a tractor, combine, sprayer, and the like. Vehicle 504 may be coupled to one or more implements, such as implement 508. Implement 508 may be the same, or function in a similar manner, as implement 108 and/or implement 408 described above. For example, implement 408 may be a machine or device that configures vehicle 404 to perform a particular function, such as a ripper, sprayer, combine, and the like. As described above, a two-dimensional footprint may be generated to represent the horizontal perimeter of vehicle 504 and implement 508. Additionally, or alternatively, three-dimensional envelopes 524 may be generated to represent both the horizontal and vertical space occupied by vehicle 504 and/or implement 508.

For example, as illustrated, envelope 524-1 may be generated for vehicle 504 and envelope 524-2 may be generated for implement 508. As further illustrated, envelopes 524 may include various vertical measurements 520. For example, as illustrated in FIG. 5A, envelope 524-1 may include a first vertical measurement 520-1 representing a height from surface 501 to a top of a cab of vehicle 504, and a second vertical measurements 520-2 representing a height from surface 501 to a top of a tank of vehicle 504. As another example illustrated in FIG. 5B, envelope 524-2 may include a vertical measurement 520-3 from surface 501 to a bottom of implement 508.

Environment 500 may include one or more boundaries 510. Boundaries 510 may function in a similar manner as described above. For example, boundaries 510 may encompass or define a sub-area or sub-region within environment 500 corresponding to actual physical structures and/or virtual boundaries. As further described above, boundaries 510 may be defined in three-dimensional space. For example, as illustrated in FIG. 5A, boundary 510-1 may be defined for a bridge and include multiple coordinates in three-dimensional space corresponding to the actual measurements of the bridge, including height 515-1 from surface 501 to a bottom of boundary 510-1. As another example, and as illustrated in FIG. 5B, boundary 510-2 may be defined for a fence, wall, post, sprinkler head, or other similar physical structure protruding from surface 501 with height 515-2 from surface 501 to a top of boundary 510-2.

In a similar manner as described above in relation to generating two-dimensional projection footprints, three-dimensional projection envelopes may be generated to represent the three-dimensional space vehicle 504 and/or implement 508 will occupy along a path between a current position and orientation and a future position and orientation. Further, comparing the three-dimensional projection envelopes for vehicle 504 and/or implement 508 with boundaries 510, it may be determined whether, when, and/or where, the three-dimensional projection envelopes will intersect with boundaries 510. For example, as illustrated in FIG. 5A, while first vertical measurements 520-1 of envelope 524-1 is less than height 515-1, it may be determined that vehicle 504 will intersect with boundary 510-1 unless precautionary actions are taken because second vertical measurement 520-2 is greater than height 515-1 from surface 501 to the bottom of boundary 510-1. As another example, and as illustrated in FIG. 5B, it may be determined that, while envelope 524-2 will pass over a horizontal location of boundary 510-2, because vertical measurement 520-3 from surface 501 to a bottom of implement 508 is greater than height 515-2 of boundary 510-2, envelope 524-2 will not intersect with boundary 510-2, and therefore precautionary action is not necessary.

Figure 6:
FIG. 6 illustrates an exemplary block diagram of a system configured to control an autonomously driven vehicle to avoid geofence boundaries.

FIG. 6 illustrates an exemplary block diagram of a system 600 configured to control an autonomously driven vehicle to avoid geofence boundaries. System 600 may be operably coupled to, and/or otherwise installed within, a vehicle, such as vehicle 104 described above. System 600 can include operator input/output (I/O) module 604, sensor module 616, control module 628, and vehicle electronic control unit (ECU) 644. One or more components of system 600 may be implemented as software executing on one or more general and/or special purpose computers. For example, operator I/O module 604 and control module 628 may be executed on a laptop, tablet, smartphone, or other computerized device while sensor module 616 and vehicle ECU 644 are executed on one or more embedded systems of a vehicle. One or more components of system 600 may be executed remotely from a vehicle. For example, control module 628 and/or operator I/O module 604 may be executed on a remote server system, such as a cloud-based server system.

Components of system 600 may communicate with other components of system 600 via wired and/or wireless communications. For example, sensor module 616 may communicate with control module 628 via Bluetooth®, Wi-Fi, Ulti-wideband (UWB), and the like. As another example, control module 628 may communicate with operator I/O module 604 via universal serial bus (USB), ethernet, Universal Synchronous Asynchronous Receiver Transmitter (USART) protocols, and the like.

Operator I/O module 604 may include user terminal 608 and vehicle controls 612. User terminal 608 may include one or more software and/or hardware interfaces configured to receive operator interactions with one or more graphical user interfaces (GUIs). For example, user terminal 608 may include, and/or be configured to receive inputs from, any one, or a combination, of a touch sensitive display, a keyboard, a mouse, USB ports, optical disk readers, and the like. Additionally, or alternatively, user terminal 608 may include one or more software and/or hardware interfaces configured to generate outputs to a user. For example, user terminal 608 may include, and/or be configured to generate outputs for, any one, or a combination, of one or more display screens, visual indicators (e.g., LEDs), audio indicators (e.g., speakers), haptic indicators (e.g., vibrators), and the like.

In some embodiments, user terminal 608 is configured to receive one or more geofence boundaries, such as boundaries 410 described above. For example, user terminal 608 may output one or more GUIs configured to receive operator inputs to create and/or edit geofence boundaries by specifying one or more geographic coordinates. As another example, the one or more GUIs may be configured to receive a selection of a predefined geofence boundary saved in a memory accessible by user terminal 608, such as a USB storage device, hard disk drive, and the like.

In some embodiments, user terminal 608 is configured to receive one or more vehicle and/or implement definitions. For example, one or more GUIs may be configured to receive a selection of a particular vehicle and/or implement system from a set of vehicle and/or implement systems with predefined dimensions. Additionally, or alternatively, one or more GUIs may enable an operator to enter one or more dimensions associated with a new vehicle and/or implement system.

In some embodiments, user terminal 608 is configured to receive one or more operating limits associated with a vehicle and/or implement system. Operating limits associated with a vehicle and/or implement system may include such limits as a maximum speed, a maximum deceleration rate, a minimum stopping distance, a minimum turning radius, a range of relative orientations between an implement and a vehicle, and the like.

Vehicle controls 612 may include a combination of software and/or hardware components configured to enable an operator to control various functions associated with a vehicle and/or implement system. For example, vehicle controls 612 may include, and/or be configured to receive inputs from, any one, or a combination, of a steering wheel, a joystick, a yoke, one or more control pedals, one or more buttons and/or switches, one or more levers, and the like. As another example, vehicle controls 612 may include software and/or firmware components configured to receive physical user inputs from hardware components and translate them into control signals for control components, as described further below in reference to vehicle ECU 644.

Sensor module 616 may include one or more software and/or hardware components configured to manage the collection of data from one or more sensors, including position sensors 620 and implement sensors 624. Position sensors 620 may be the same, or function in a similar manner, as location sensors 128 described above. For example, position sensors 620 may include any combination of sensors configured to determine a three-dimensional position in space, such as a GNSS receiver, LPS receiver and the like. Additionally, or alternatively, position sensors 620 may include one or more movement sensors (e.g., accelerometers, magnetometers, and/or gyroscopes) to determine a three-dimensional position, geographic coordinates, and/or a heading, using an inertial navigation system (INS).

Implement sensors 624 may include one or more sensors and/or control modules associated with an implement, or the attachment point between an implement and a vehicle, configured to determine, and/or control, the relative orientation of an implement with respect to the vehicle to which the implement is coupled. For example, implement sensors 624 may include a servo sensor configured to monitor a current angle maintained by a moveable attachment point of an implement. Additionally, or alternatively, implement sensors 624 may include position and/or orientation sensors, such as position sensors 620, coupled to an implement and configured to determine the relative orientation of an implement with respect to a vehicle based on the differences in position between one or more sensors coupled to the implement and one or more sensors coupled to the vehicle.

Vehicle ECU 644 may include engine control 648, brake control 652, steering control 656, and implement control 660. The components of vehicle ECU 644 may function independently, and/or in combination, to control the movement and functions of a vehicle in the real world. For example, engine control 648 may receive one or more control signals (e.g., from control module 628 and/or vehicle controls 612) and adjust an engine throttle to increase or decrease the speed of a vehicle. Similarly, brake control 652 may receive one or more command inputs intended to control one or more brake mechanisms on a vehicle. Steering control 656 may receive one or more steering inputs (e.g., from a steering wheel), to adjust a current steering state of a vehicle. Additionally, or alternatively, steering control 656 may transmit a current steering state to control module 628 for additional processing associated with generating projection footprints, as described further below. Implement control 660 may include one or more mechanisms configured to control the operation and/or movement of an implement coupled to a vehicle.

Control module 628 may include footprint engine 632, database 636, and geofence gateway 640. Footprint engine 632 may include one or more software applications, processes, methods, and the like, that configure a computer to generate two or three-dimensional footprints for a vehicle and/or implement system, such as footprints 224 described above. Additionally, or alternatively, footprint engine 632 may configure a computer to generate two or three-dimensional projection footprints for a vehicle and/or implement system, such as two-dimensional projection footprint 416 described above.

Footprint engine 632 may use data received from operator I/O module 604, sensor module 616, vehicle ECU 644, and/or database 636 to generate current and projected footprints and/or envelopes. For example, after receiving a selection of a particular vehicle from a set of vehicles, footprint engine 632 may identify a footprint and/or envelope associated with the particular vehicle in database 636. Further, after receiving position and orientation information from sensor module 616, footprint engine 632 may adjust the position and orientation of the footprint and/or envelope to correspond with the position and orientation of the vehicle in the real world. Similarly, after receiving a current steering state from vehicle ECU 644, footprint engine 632 may generate a projection footprint and/or envelope, as described above.

Geofence gateway 640 may determine that a vehicle and/or implement will intersect with at least one of the geofence boundaries. For example, after receiving a two-dimensional projection footprint from footprint engine 632 associated with a vehicle and/or implement system, geofence gateway 640 may compare the outer bounds of the footprint and/or envelope with one or more geofence boundaries. Based on the comparison, geofence gateway 640 may identify an intersection between the footprint and/or envelope and a geofence boundary and determine that the vehicle and/or implement will intersect with the geofence boundary. Geofence gateway 640 may then determine at what future position and orientation the vehicle and/or implement will intersect with the geofence boundary and the travel distance along a path from a current position and orientation to the future position and orientation.

In some embodiments, geofence gateway 640 is configured to take one or more actions in response to determining that a vehicle and/or implement will intersect with a geofence boundary. For example, geofence gateway 640 may transmit a warning indication to a display of user terminal 608 indicating a potential impact. Additionally, or alternatively, geofence gateway 640 may generate one or more evasive and/or precautionary actions for display to an operator of the vehicle.

In some embodiments, geofence gateway 640 is configured to automatically execute the one or more evasive and/or precautionary actions to enforce compliance with the one or more geofence boundaries. For example, after determining that a vehicle and/or implement will intersect with a geofence boundary, geofence gateway 640 may transmit a maximum speed limit, as further described above, to engine control 648 to limit the speed of the vehicle. As another example, geofence gateway 640 may transmit one or more modified steering commands to steering control 656 to adjust the current path or trajectory of the vehicle to avoid intersection with the geofence boundary.

Various methods may be performed using the systems and arrangements of FIGS. 1-5. FIG. 7 illustrates an embodiment of a method 700 of operating an autonomously driven vehicle to avoid geographic boundaries. Method 700 may be performed using system 600 described above. At block 704, a geofence boundary may be received. The geofence boundary may be received at a display coupled to the autonomously driven vehicle, as described above in reference to user terminal 608. For example, an operator may enter one or more geographic coordinates to be connected together in series to form one or more geofence boundaries. Additionally, or alternatively, the geofence boundary may be selected from a collection of predefined geofence boundaries via one or more GUIs displayed to an operator. In some embodiments, the one or more geofence boundaries may be stored in a memory communicatively coupled to the display, such as database 636 described above.

At block 708, a two-dimensional footprint may be generated for a vehicle and implement. The two-dimensional footprint may represent the horizontal perimeter surrounding the autonomously driven vehicle and one or more implements attached to the autonomously driven vehicle. The two-dimensional footprint may be generated by a control module, such as control module 640 as described above in relation to footprint engine 632. The two-dimensional footprint may be generated using a definition of the autonomous vehicle and the implement attached to the vehicle. For example, based on one or more physical dimensions (e.g., widths, lengths, angles, etc.) associated with the vehicle and implement, separate two-dimensional footprints may be generated. As another example, based on the location on the vehicle at which the implement is coupled thereto, and/or the relative orientation of the implement with respect to the remainder of the vehicle, a combined two-dimensional footprint representing the horizontal perimeter of the vehicle and implement combination may be generated. In some embodiments, the two-dimensional footprint is dependent on the relative orientation of the implement with respect to the vehicle. That is, as the relative orientation of the implement with respect to the vehicle changes in the real world, the two-dimensional footprint for the vehicle and implement changes to reflect the changes in the real world.

At block 712, a current position and orientation for the two-dimensional footprint in the real world may be determined. The current position for the two-dimensional footprint may be determined using geographic coordinates received from one or more location sensors affixed to the autonomously driven vehicle, such as location sensors 128 described above. For example, based on the location at which the location sensor is affixed to the autonomously driven vehicle, a corresponding location within the two-dimensional footprint may be determined. Further, based on the geographic coordinates received from the location sensor, the two-dimensional footprint may be positioned such that the corresponding location within the two-dimensional footprint is at the geographic coordinates received from the location sensor. The current orientation for the two-dimensional footprint may be determined from a heading of the autonomously driven vehicle. For example, based on a magnetic compass heading associated with the autonomously driven vehicle, the two-dimensional footprint may be oriented to achieve the same heading.

At block 716, a current steering state for the vehicle may be determined. The current steering state may include a current steering angle for one or more steering mechanisms of the autonomously driven vehicle. For example, the current steering angle may be associated with a front and/or rear axle steering mechanism. As another example, the current steering angle may the relative angle between a front and a rear axle as provided by a pivot point, such as pivot point 332 as described above.

In some embodiments, a future position and orientation for the vehicle and/or the two-dimensional footprint is determined by following a path defined by the current steering state along a direction of travel of the autonomously driven vehicle from the current position and orientation for a predefined distance. The predefined distance may be selected based on the minimum stopping distance of the vehicle, a current speed of the vehicle, and the like. For example, the predefined distance may be increased as the speed of the vehicle increases and vice versa.

At block 720, a two-dimensional projection footprint for the vehicle may be generated. The two-dimensional projection footprint may represent the horizontal space the two-dimensional footprint will occupy in the real world as the vehicle travels from its current position and orientation to a future position and orientation. As described above, the future position and orientation may be determined by extending the two-dimensional footprint along a trajectory path defined by the current steering state of the vehicle for a predefined distance.

In some embodiments, the two-dimensional projection footprint is re-generated at regular intervals. For example, to account for changes in vehicle operation controls (e.g., steering, throttle, and/or brake inputs), the frequency at which the two-dimensional projection footprint may be regenerated, and/or verified for continued accuracy, may be 0.5 Hz, 1 Hz, 2, Hz, 5 Hz, or a similarly suitable frequency to maintain safety. In some embodiments, the frequency at which the two-dimensional projection footprint is re-generated is dynamically adjusted. For example, the frequency may be increase as the vehicle approaches a geofence boundary and/or as the speed of the vehicle increases. As another example, the frequency may decrease as the vehicle moves away from a geofence boundary and/or as the speed of the vehicle decreases.

At block 724, it may be determined that the two-dimensional projection footprint intersects with the geofence boundary. For example, by comparing the two-dimensional projection footprint with one or more geofence boundaries, it may be determined that at least a portion of the two-dimensional projection footprint intersects with at least one geofence boundary. After determining that the two-dimensional projection footprint will intersect with the geofence boundary, a future position and orientation for the vehicle at which the intersection will occur may be determined. Based on the current trajectory of the vehicle, as defined by the current steering state, a travel distance from the current position and orientation to the future position and orientation may be determined.

At block 728, the speed of the vehicle may be maintained at or below a maximum speed. The maximum speed may be the speed from which the autonomously driven vehicle can come to a complete stop with the travel distance determined at block 724. Additionally, or alternatively, the maximum speed may be the maximum speed at which the vehicle can come to a complete stop without exceeding a predetermined deceleration rate. After determining the maximum speed, the speed of the vehicle may be limited at or below the maximum speed. For example, a control module, such as control module 628 described above, may automatically reduce the throttle and/or apply one or more brakes in order to reduce a current speed of the vehicle to be less than the maximum speed. As another example, the control module may modify throttle commands, such as from a vehicle operator, that may result in a vehicle speed exceeding the maximum speed limit.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method of maintaining an autonomously driven agricultural vehicle within geographic boundaries, the method comprising:

receiving, at a display coupled to the autonomously driven agricultural vehicle, one or more three-dimensional (3D) geofence boundaries defined for an area in which the autonomously driven agricultural vehicle is physically operating, wherein at least one of the 3D geofence boundaries is defined as a 3D surface in reference to a fixed coordinate system, and at least one of the 3D geofence boundaries defines a minimum vertical clearance above the ground within a sub-region of the area for passage by the autonomously driven agricultural vehicle through the sub-region;

storing, in a memory communicatively coupled with the display, the one or more 3D geofence boundaries;

generating, by a control module of the autonomously driven agricultural vehicle, a 3D envelope representing a volume occupied by the autonomously driven agricultural vehicle and one or more implements attached to the autonomously driven agricultural vehicle, wherein generating the 3D envelope includes:

determining, for each of the one or more implements, a relative orientation of the implement with respect to the autonomously driven agricultural vehicle, wherein the 3D envelope is dependent on the relative orientation;

receiving geographic coordinates from a location sensor affixed at a known location on the autonomously driven agricultural vehicle with respect to the 3D envelope of the autonomously driven agricultural vehicle;

determining a heading of the autonomously driven agricultural vehicle with respect to the fixed coordinate system;

determining, using the geographic coordinates and the heading, a current position and orientation for the 3D envelope with respect to the fixed coordinate system;

determining a current steering state for the autonomously driven agricultural vehicle, wherein the current steering state includes a current steering angle for a steering mechanism of the autonomously driven agricultural vehicle;

determining a future position and orientation for the 3D envelope with respect to the fixed coordinate system, wherein the future position and orientation is determined by following a path defined by the current steering state along a direction of travel of the autonomously driven agricultural vehicle from the current position and orientation for a predefined distance, wherein the predefined distance is selected based on a minimum stopping distance of the autonomously driven agricultural vehicle;

generating a 3D projection envelope for the autonomously driven agricultural vehicle with respect to the fixed coordinate system, wherein the 3D projection envelope is defined by a continuous volume that the 3D envelope occupies from the current position and orientation to the future position and orientation while the autonomously driven agricultural vehicle travels along the path from the current position and orientation to the future position and orientation;

determining, by the control module, and based on a comparison between an outer bounds of the 3D projection envelope and the one or more 3D geofence boundaries stored in the memory, that the 3D projection envelope intersects with at least one of the one or more 3D geofence boundaries;

determining, by the control module, and in response to determining that the 3D projection envelope intersects with the at least one of the one or more 3D geofence boundaries, a secondary position and orientation at which an intersection would occur, and a first travel distance from the current position and orientation to the secondary position and orientation along the path;

calculating, based on the first travel distance, a maximum speed from which the autonomously driven agricultural vehicle can come to a complete stop within the first travel distance without exceeding a predetermined deceleration rate threshold; and limiting speed commands transmitted from the control module to an engine control unit of the autonomously driven agricultural vehicle to be less than the maximum speed.

2. A method of maintaining an autonomous vehicle within geographic boundaries, the method comprising:

receiving, at a display communicatively coupled to a control module of the autonomous vehicle, a three-dimensional (3D) geofence boundary that defines a minimum vertical clearance above the ground;

generating, by the control module of the autonomous vehicle, a 3D envelope using a definition of the autonomous vehicle and an implement coupled to the autonomous vehicle;

determining, from geographic coordinates of the autonomous vehicle, a current position and orientation for the 3D envelope in the real world;

determining a current steering state for the autonomous vehicle;

determining a future position and orientation of the 3D envelope in the real world, wherein the future position and orientation is determined by following a path defined by the current steering state along a direction of travel of the autonomous vehicle from the current position and orientation for a predefined distance, wherein the predefined distance is selected based on a minimum stopping distance of the autonomous vehicle;

generating a 3D projection envelope for the autonomous vehicle, wherein the 3D projection envelope is defined by a continuous volume that 3D envelope occupies from the current position and orientation to the future position and orientation while the autonomous vehicle travels along the path from the current position and orientation to the future position and orientation;

determining, based on a comparison between an outer bounds of the 3D projection envelope and the 3D geofence boundary, that the 3D projection envelope intersects with the 3D geofence boundary;

determining, in response to determining that the 3D projection envelope intersects with the 3D geofence boundary, a secondary position and orientation at which an intersection would occur, and a first distance from the current position and orientation to the secondary position and orientation along the path; and maintaining a speed of the autonomous vehicle at or below a maximum speed determined based at least in part on the first distance.

3. The method of claim 2, wherein:

the 3D envelope represents a volume perimeter surrounding the autonomous vehicle and the implement coupled to the autonomous vehicle; and the definition of the autonomous vehicle and the implement coupled to the autonomous vehicle includes a collection of horizontal and vertical dimensions associated with the autonomous vehicle and the implement, a relative orientation of the implement with respect to the autonomous vehicle, or both.

4. The method of claim 2, wherein the 3D envelope is generated by:

generating a 3D vehicle envelope representing a volume perimeter surrounding the autonomous vehicle;

generating a 3D implement envelope representing the volume perimeter surrounding the implement; and combining the 3D vehicle envelope with the 3D implement envelope.

5. The method of claim 4, wherein the 3D vehicle envelope and the 3D implement envelope are combined by:

determining a relative orientation of the implement with respect to the autonomous vehicle; and combining the 3D vehicle envelope with the 3D implement envelope with a same relative orientation as the relative orientation of the implement with respect to the autonomous vehicle.

6. The method of claim 2, further comprising:

determining that a relative orientation of the implement with respect to the autonomous vehicle has changed; and in response, modifying the 3D envelope based on the change in the relative orientation of the implement with respect to the autonomous vehicle.

7. The method of claim 2, wherein the implement is freely coupled to the autonomous vehicle, and the method further comprises:

determining a relative orientation of the implement with respect to the autonomous vehicle using differential location measurements, orientation measurements, or both collected from one or more sensors coupled to the autonomous vehicle and one or more sensors coupled to the implement.

8. The method of claim 2, wherein the implement is controllably coupled to the autonomous vehicle by one or more attachment mechanisms, and the method further comprises:

determining a relative orientation of the implement with respect to the autonomous vehicle using measurements from the one or more attachment mechanisms.

9. The method of claim 2, wherein the current steering state for the autonomous vehicle is determined by:

determining a steering type for the autonomous vehicle selected from a group of steering types consisting of: single axle steering, double axle steering, articulated steering, and track based or differential drive based steering; and receiving a current steering angle from a steering mechanism of the autonomous vehicle.

10. The method of claim 2, further comprising generating an updated 3D projection envelope in response to determining that a position and orientation of the autonomous vehicle has changed.

11. The method of claim 2, wherein the definition of the autonomous vehicle and an implement coupled to the autonomous vehicle includes one or more height measurements and the method further comprises:

generating the 3D envelope and the 3D projection envelope using the one or more height measurements.

12. A non-transitory processor-readable storage medium, comprising processor-readable instructions configured to cause one or more processors to:

receive, at a display communicatively coupled to a control module of an autonomous vehicle, a three-dimensional (3D) geofence boundary that defines a minimum vertical clearance above the ground;

generate a 3D envelope using a definition of the autonomous vehicle and an implement coupled to the autonomous vehicle;

determine, from geographic coordinates of the autonomous vehicle, a current position and orientation for the 3D envelope in the real world;

determine a current steering state for the autonomous vehicle;

determine a future position and orientation of the 3D envelope in the real world, wherein the future position and orientation is determined by following a path defined by the current steering state along a direction of travel of the autonomous vehicle from the current position and orientation for a predefined distance, wherein the predefined distance is selected based on a minimum stopping distance of the autonomous vehicle;

generate a 3D projection envelope for the autonomous vehicle, wherein the 3D projection envelope is defined by a continuous volume that the 3D envelope occupies from the current position and orientation to the future position and orientation while the autonomous vehicle travels along the path from the current position and orientation to the future position and orientation;

determine, based on a comparison between an outer bounds of the 3D projection envelope and the 3D geofence boundary, that the 3D projection envelope intersects with the 3D geofence boundary;

determining, in response to determining that the 3D projection envelope intersects with the 3D geofence boundary, a secondary position and orientation at which an intersection would occur, and a first distance from the current position and orientation to the secondary position and orientation along the path; and maintain a speed of the autonomous vehicle at or below a maximum speed determined based at least in part on the first distance.

13. The non-transitory processor-readable storage medium of claim 12, wherein:

the 3D envelope represents a volume perimeter surrounding the autonomous vehicle and the implement coupled to the autonomous vehicle; and the definition of the autonomous vehicle and the implement coupled to the autonomous vehicle includes a collection of horizontal and vertical dimensions associated with the autonomous vehicle and the implement, a relative orientation of the implement with respect to the autonomous vehicle, or both.

14. The non-transitory processor-readable storage medium of claim 12, wherein the 3D envelope is generated by:

generating a 3D vehicle envelope representing a volume perimeter surrounding the autonomous vehicle;

generating a 3D implement envelope representing the volume perimeter surrounding the implement; and combining the 3D vehicle envelope with the 3D implement envelope.

15. The non-transitory processor-readable storage medium of claim 14, wherein the 3D vehicle envelope and the 3D implement envelope are combined by:

determining a relative orientation of the implement with respect to the autonomous vehicle; and combining the 3D vehicle envelope with the 3D implement envelope with a same relative orientation as the relative orientation of the implement with respect to the autonomous vehicle.

16. The non-transitory processor-readable storage medium of claim 12, wherein the instructions are further configured to cause one or more processors to:

determine that a relative orientation of the implement with respect to the autonomous vehicle has changed; and in response, modify the 3D envelope based on the change in the relative orientation of the implement with respect to the autonomous vehicle.

17. The non-transitory processor-readable storage medium of claim 12, wherein the implement is freely coupled to the autonomous vehicle, and the instructions are further configured to cause one or more processors to:

determine a relative orientation of the implement with respect to the autonomous vehicle using differential location measurements, orientation measurements, or both collected from one or more sensors coupled to the autonomous vehicle and one or more sensors coupled to the implement.

18. The non-transitory processor-readable storage medium of claim 12, wherein the implement is controllably coupled to the autonomous vehicle by an attachment mechanism, and the instructions are further configured to cause one or more processors to:

determine a relative orientation of the implement with respect to the autonomous vehicle using measurements from the attachment mechanism.

19. The non-transitory processor-readable storage medium of claim 12, wherein the current steering state for the autonomous vehicle is determined by:

determining a steering type for the autonomous vehicle selected from a group of steering types consisting of: single axle steering, double axle steering, and articulated steering; and receiving a current steering angle from a steering mechanism of the autonomous vehicle.

20. The non-transitory processor-readable storage medium of claim 12, wherein the maximum speed is further determined based on a maximum deceleration rate for the autonomous vehicle.

* * * * *